(12) United States Patent
Liao

(10) Patent No.: US 7,486,447 B2  
(45) Date of Patent: Feb. 3, 2009

(54) COMPACT ZOOM LENS

(75) Inventor: Chen-cheng Liao, Taichung (TW)

(73) Assignee: Asia Optical Co., Inc, Taichung (TW)

( * ) Notice: Subject to any disclaimer, the term of this patent is extended or adjusted under 35 U.S.C. 154(b) by 233 days.

(21) Appl. No.: 11/152,204

(22) Filed: Jun. 15, 2005

(65) Prior Publication Data

US 2006/0050404 A1   Mar. 9, 2006

(30) Foreign Application Priority Data

Sep. 7, 2004   (TW) .............................. 93126991 A (51) Int. Cl.  
*G02B 15/14* (2006.01)

(52) U.S. Cl. ...................................... 359/689; 359/684

(58) Field of Classification Search ................. 359/684, 359/689  
See application file for complete search history.

(56) References Cited

U.S. PATENT DOCUMENTS

| | | |
|---|---|---|
| 6,191,896 B1 | 2/2001 | Itoh |
| 6,233,099 B1 | 5/2001 | Itoh |
| 6,650,486 B2 | 11/2003 | Chen |
| 6,738,196 B2 * | 5/2004 | Yamamoto ................... 359/680 |
| 6,785,055 B2 * | 8/2004 | Nishikawa et al. ........... 359/681 |
| 2003/0012567 A1 | 1/2003 | Itoh |
| 2003/0218806 A1 * | 11/2003 | Nanba ......................... 359/680 |

* cited by examiner

*Primary Examiner*—William C Choi (57) ABSTRACT

A compact zoom lens includes, from the object side to the image side, a negative first lens group (1), a positive second lens group (2) and a positive third lens group (3). The first lens group is stationary, and both the second and third lens groups are movable along the optical axis. The compact zoom lens is zoomed by varying the distance between the first and second lens groups, and the focal length is adjusted by varying the distance between the second and third lens groups. The zoom lens is composed of only four single lenses in three groups, of which three (10, 31, 32) are plastic aspheric lenses and one (20) is a glass spherical lens.

19 Claims, 7 Drawing Sheets

COMPACT ZOOM LENS

BACKGROUND OF THE INVENTION

1. Field of the Invention

The present invention relates to a zoom lens, and particularly relates to a compact zoom lens capable of taking both wide angle and telephoto shots, of which the overall length is shortened for use in a camera phone, a compact digital camera, etc.

2. Description of Prior Art

It is well known that, due to the limited space, photographing lenses used in camera phones and compact digital cameras have dimensions much smaller than those in photographic cameras and video cameras. Accordingly, camera phones and compact digital cameras generally employ fixed focal length lenses, which are disclosed, for example, in U.S. Pat. No. 6,650,486.

Recently, with the rapid development of the solid state image pickup device used in cameras, such as a CCD (Charge-Coupled Device) sensor or a CMOS (Complimentary Metal-Oxide Semiconductor) sensor, image resolutions for camera phones have been increased from 0.1 million pixels, 0.35 million pixels to 1.3 million pixels and even 2 million pixels. However, since the focal length of a fixed lens is fixed rather than adjustable, the angle of view that the picture takes in is also set. Thus, the photo taker has to move closer or further to the object to be photographed or change lenses. In the former case, it may not be possible to get noticeably closer. Accordingly, it is very inconvenient for the photo taker to use a fixed lens for photography. In addition, when digital zoom is applied, the resulting image will be degraded. As is well known, the main disadvantage of digital zoom is that the more that the photo taker zooms in with the digital zoom, the greater the enlargement and the lower the image quality. Therefore, currently, optical zoom using a number of lenses is still more preferred.

Various designs of optical zoom lenses have been proposed. In U.S. Pat. Nos. 6,191,896 and 6,233,099 assigned to Canon, there is disclosed a four-group zoom lens having, from the object side thereof, a negative-positive-negative-positive refractive power configuration. During zooming, all the lens groups move along the optical axis in such a manner that the distance between every two lens groups is changed. U.S. Pat. Application No. 20030012567 discloses a three-group zoom lens having, from the object side thereof, a negative-positive-positive refractive power configuration. Zooming is effected by varying the distance between the first and second lens groups, and the third lens group is not moved during zooming. However, during focusing and zooming, the overall length of each of the conventional zoom lenses as described above is changed. When the position of the first lens group varies upon zooming, working distance and the focusing position varies in the close-up focusing range, so it is not so easy to handle and use. Further, each of the above conventional zoom lens is composed of at least six single lenses, and thus is difficult to incorporate into a mobile phone with a thickness generally less than 20 mm. Also, the production cost and weight are increased, thereby contradicting the compactness trend. Even the above conventional zoom lens is incorporated into the mobile phone, accident impact on or damage to the zoom lens may be caused during operation since the overall length varies during focusing and zooming. In addition, since the front lens barrel is rotated during focusing, it is inconvenient for the photo taker to use a circular polarizing filter and Petal-type hood.

It is reported that, Philips Research has demonstrated a unique liquid zoom lens that alters its focal length by changing its shape. The Philips liquid lens consists of two immiscible (non-mixing) fluids of different refractive index, one an electrically conducting aqueous solution and the other an electrically non-conducting oil, contained in a short tube with transparent end caps. Without an electrical charge, the surface of the conducting liquid forms a curve. But when a charge is applied through the electrodes, the surface tension of the liquid changes, altering its curvature and thus the focal point of light passing through it. Different voltages produce different curvature changes. However, the operational durability, the optical performance and the lifespan of this unique zoom lens remain to be further tested. Therefore, its rapid introduction into high-volume manufacturing cannot be expected.

SUMMARY OF THE INVENTION

Accordingly, one object of the present invention is to provide a compact zoom lens capable of taking both wide angle and telephoto shots, which has a significantly reduced number of component lenses while without decreasing the optical performance.

Another object of the present invention is to provide a compact zoom lens capable of taking both wide angle and telephoto shots, which has a fixed and shortened overall length.

To achieve the above objects of the present invention, a compact zoom lens in accordance with the present invention includes, from the object side to the image side, a first lens group of negative refractive power, a second lens group of positive refractive power and a third lens group of positive refractive power. The first lens group is stationary for receiving light from the object to be photographed. Both the second and third lens groups are movable along the optical axis. The focal length change is effected by varying the distance between the first and second lens groups. The third lens group is a compensation lens group that is movable to effect the correction of an image point position resulting from the focal length change. The third lens group is also adapted to compensate for field curvature and change in back focal length due to temperature change.

The compact zoom lens of the present invention provides a great back focal length and satisfies the following conditional expression:

$$0.27 < \frac{f_{bw}}{TT} < 0.35 \quad (a\text{-}1)$$

where $f_{bw}$ is the back focal length at the wide-angle end, and TT is the total optical track of the present zoom lens.

To achieve an approximately 2× zoom ratio, the second and third lens groups of the present zoom lens satisfies the following condition:

$$1.7 < \frac{f_2}{f_3} < 2.9 \quad (a\text{-}2)$$

where $f_2$ represents the focal length of the second lens group, and $f_3$ represents the focal length of the third lens group.

The present zoom lens further satisfies the following condition:

$$0.16 < \frac{I_C}{TT} < 2.2 \qquad (a\text{-}3)$$

where $I_C$ represents the radius of an image circle and TT represents the total optical track of the present zoom lens.

The second lens group of the present zoom lens includes a single lens of positive refractive power that is movable for varying focal length. Both the surfaces on the object and image sides of the single positive lens are spherical.

The third lens group of the present zoom lens includes a single positive lens and a single negative lens both of which have at least one aspheric surface.

The first lens group of the present zoom lens includes a single negative lens for receiving light. The single negative lens has at least one aspheric surface.

The above aspheric surfaces of the present zoom lens are expressed by the following equation:

$$z = \frac{ch^2}{1+[1-(k+1)c^2h^2]^{\frac{1}{2}}} + Ah^4 + Bh^6 + Ch^8 + Dh^{10}$$

where, z represents a sag amount which is defined as a distance from a point on the aspheric surface to a plane tangential to the aspheric surface at the optical axis; $c=1/r$, r is the paraxial radius of curvature; h represents a height of a point on the aspheric surface with respect to the optical axis; k represents a cone constant; and A, B, C and D are aspheric coefficients for fourth, sixth, eighth and tenth order terms.

BRIEF DESCRIPTION OF THE DRAWINGS

The present invention may best be understood through the following description with reference to the accompanying drawings, in which.

DETAILED DESCRIPTION OF THE INVENTION

Figure 1:
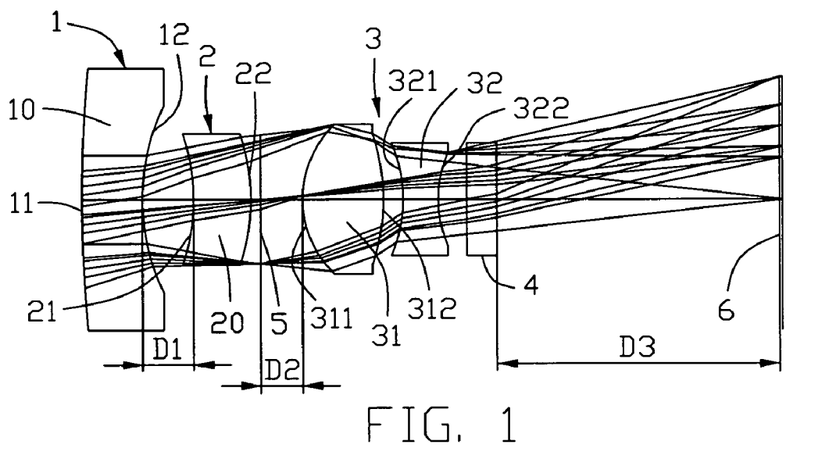
FIG. 1 is an optical cross-sectional view of a compact zoom lens in accordance with the present invention, showing a lens configuration at the telephoto end.

FIG. 1 is an optical cross-sectional view of a compact zoom lens in accordance with the present invention, showing a lens configuration at the telephoto end. The present compact zoom lens includes, from the object side to the image side, a first lens group 1 of negative refractive power, a second lens group 2 of positive refractive power and a third lens group 3 of positive refractive power. The first lens group 1 includes a single lens 10 of negative refractive power located at the frontmost position of the optical system for receiving light from the object to be photographed. The single negative lens 10 is preferably made of plastic by injection molding, and is an aspheric lens having at least one aspheric surface. In the preferred embodiment, the first surface 11 of the single negative lens 10 on the object side is a slightly convex aspheric surface, and the opposite second surface 12 on the image side is a concave aspheric surface. The present zoom lens thus has an angle of view of 65.3 degrees.

The second lens group 2, which is movable along the optical axis for effecting the focal length change, includes a positive single lens 20 made of glass. Both the first and second surfaces 21, 22 of the positive single lens 20 on the respective object and image sides are spherical surfaces. The configuration of the positive single lens 20 allows the present zoom lens to have great permissible tolerance ranges, thereby facilitating high volume manufacturing.

The third lens group 3 is movable to compensate for the image plane 6 shift resulting from the focal length change, so that the position of the image plane 6, on which an image pickup device (a photoelectric conversion element) such as a CCD or CMOS is to be disposed, is maintained. The third lens group 3 includes, from the object side to the image side, a single positive lens 31 and a single negative lens 32 both of which are aspheric lenses and are preferably made of plastic by injection molding. At least one of the opposite first and second surfaces 311, 312 of the single positive lens 31 is aspheric. Similarly, at least one of the opposite first and second surfaces 321, 322 of the single negative lens 32 is aspheric. The single positive lens 31 has a positive focal length, so as to compensate for the change in back focal length caused by the plastic negative lens 10 and the plastic negative lens 32 due to temperature variation. The back focal length is the distance measured along the optical axis from the rear vertex of the negative lens 32 to the image plane 6. By the provision of the compensating positive lens 31, the use of plastic material thus has a minimal impact on the focusing stability of the present zoom lens even though the plastic material is more sensitive to the environmental conditions. Further, the positive lens 31 also serves to compensate for field curvature. By the provision of aspheric surfaces on the positive lens 31 and the negative lens 32, the aberrations other than chromatic aberration can be well corrected, thereby ensuring optical performance of the present zoom lens.

Figure 2:
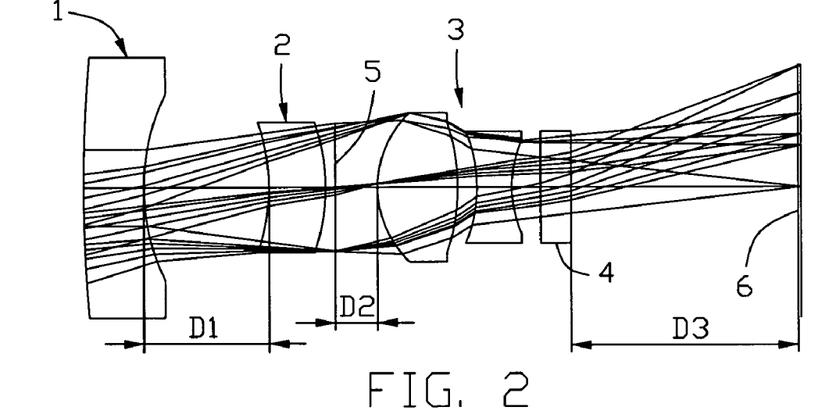
FIG. 2 is an optical cross-sectional view of a compact zoom lens in accordance with the present invention, showing a lens configuration at an intermediate zoom position.
Figure 3:
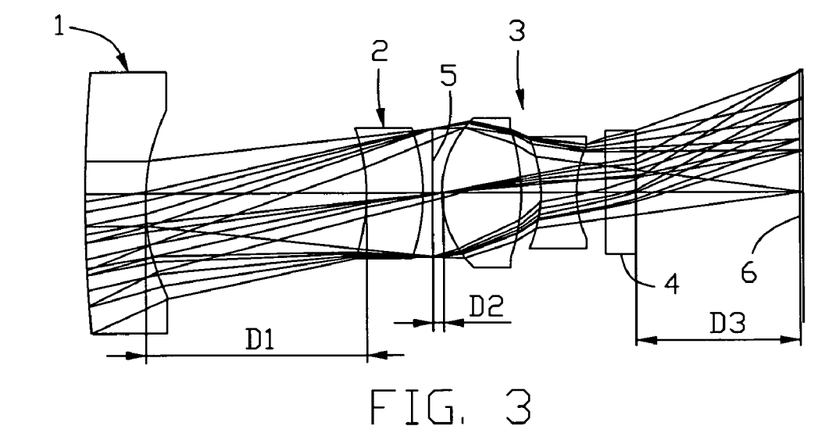
FIG. 3 is an optical cross-sectional view of a compact zoom lens in accordance with the present invention, showing a lens configuration at the wide-angle end.
Figure 4:
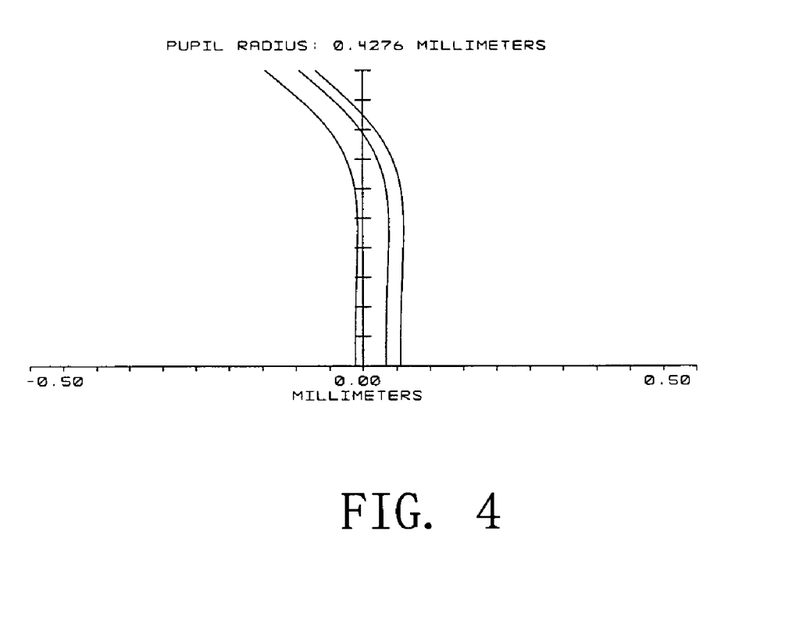
FIGS. 4-7 respectively show spherical aberration, astigmatism aberration, distortion aberration and lateral chromatic aberration at the wide-angle end of the present compact zoom lens according to Numerical Embodiment 1.
Figure 5:
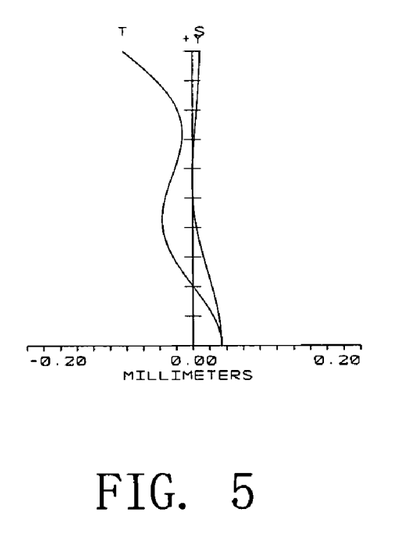
Figure 6:
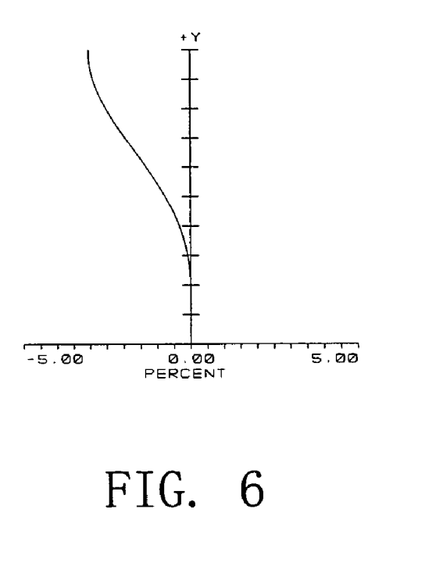
Figure 7:
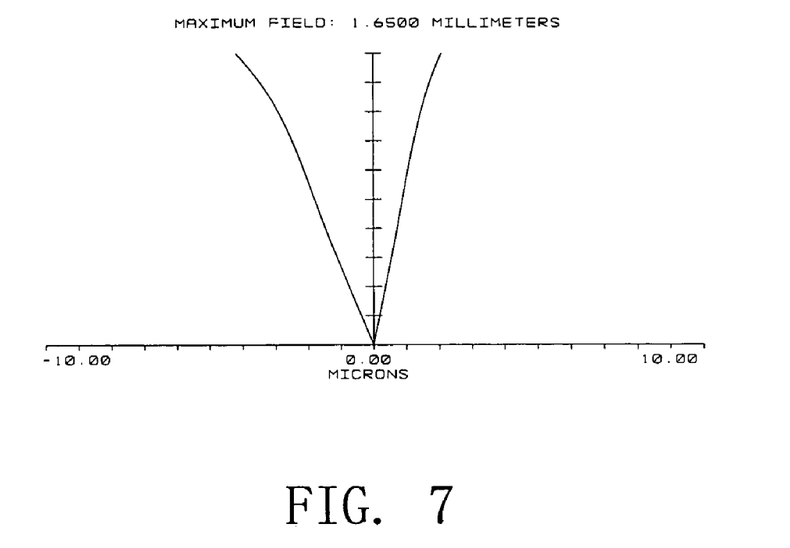
Figure 8:
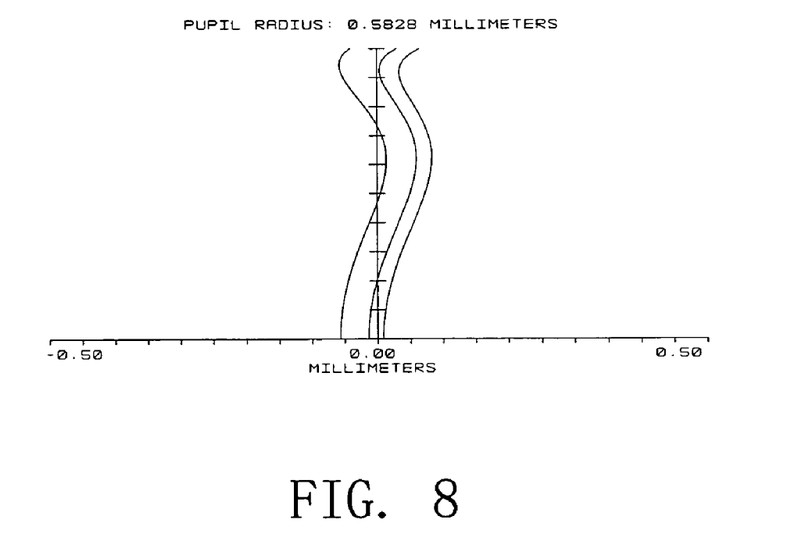
FIGS. 8-11 respectively show spherical aberration, astigmatism aberration, distortion aberration and lateral chromatic aberration at the telephoto end of the present compact zoom lens according to Numerical Embodiment 1.
Figure 9:
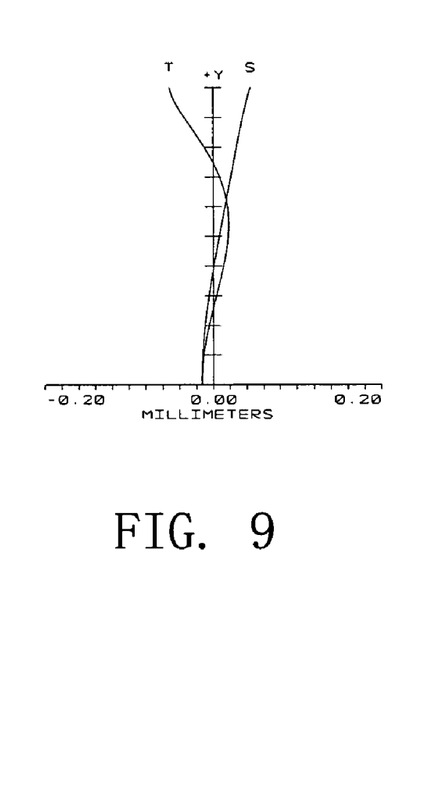
Figure 10:
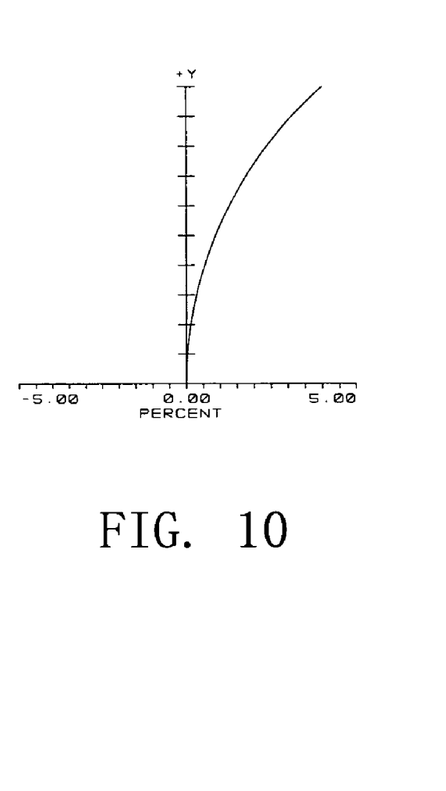
Figure 11:
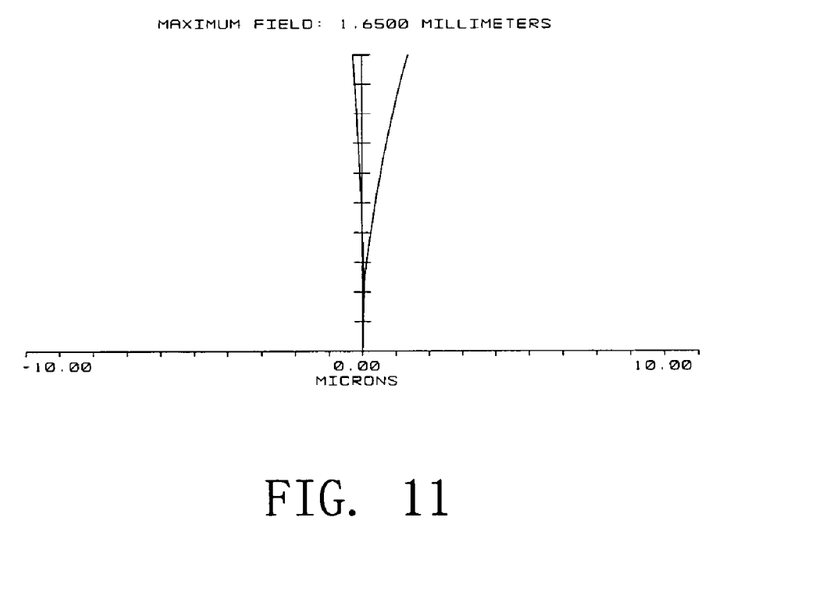
Figure 12:
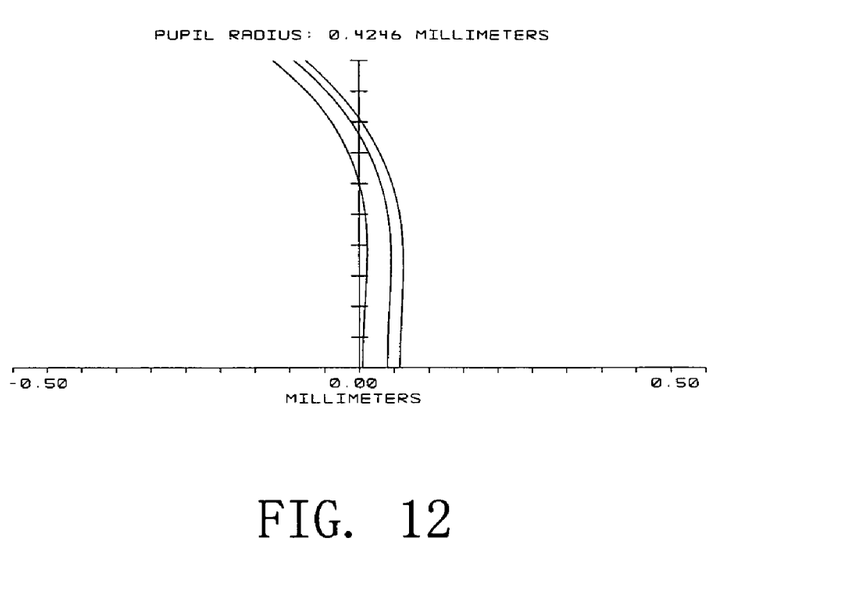
FIGS. 12-15 respectively show spherical aberration, astigmatism aberration, distortion aberration and lateral chromatic aberration at the wide-angle end of the present compact zoom lens according to Numerical Embodiment 2.
Figure 13:
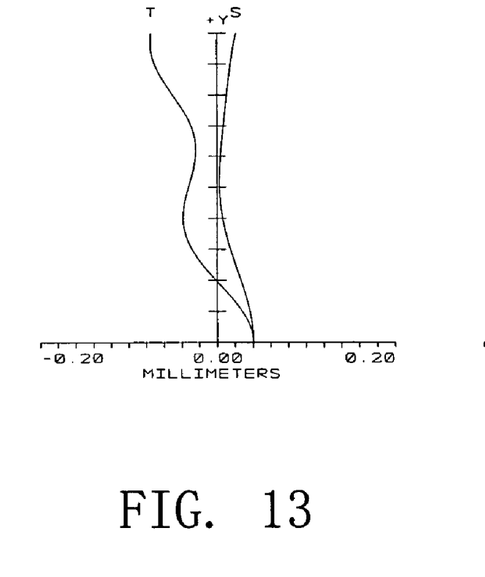
Figure 14:
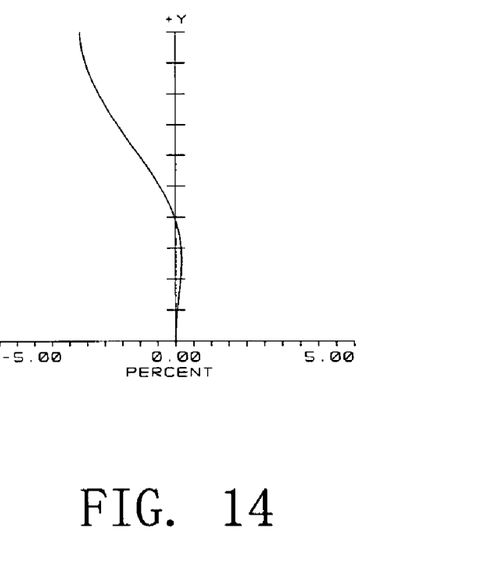
Figure 15:
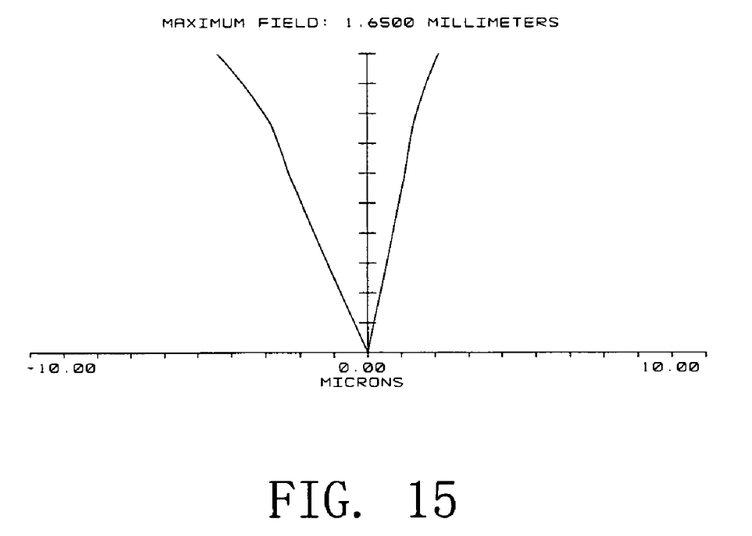
Figure 16:
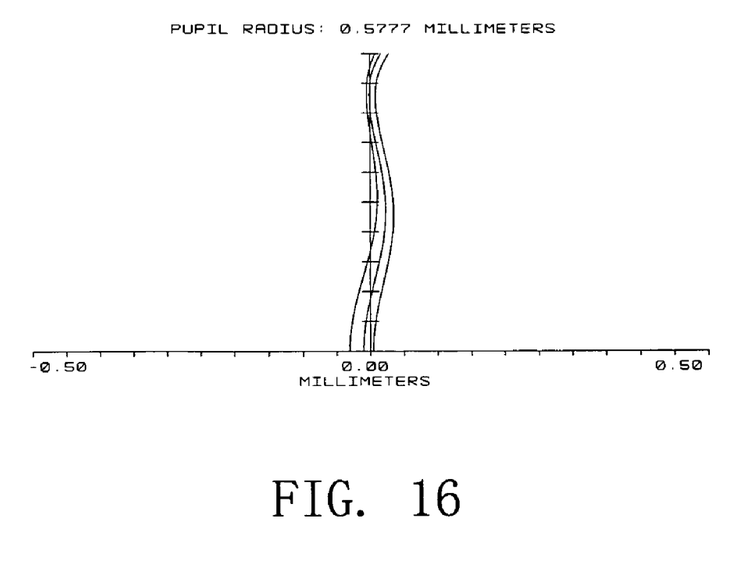
FIGS. 16-19 respectively show spherical aberration, astigmatism aberration, distortion aberration and lateral chromatic aberration at the telephoto end of the present compact zoom lens according to Numerical Embodiment 2.
Figure 17:
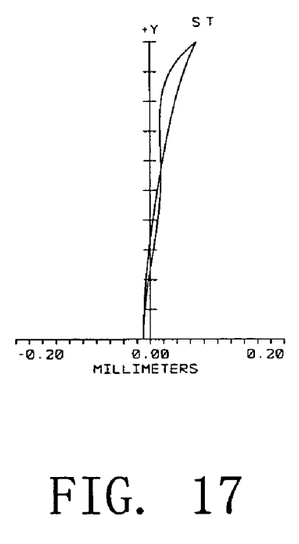
Figure 18:
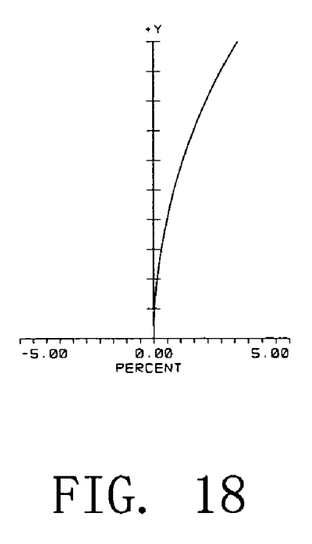
Figure 19:
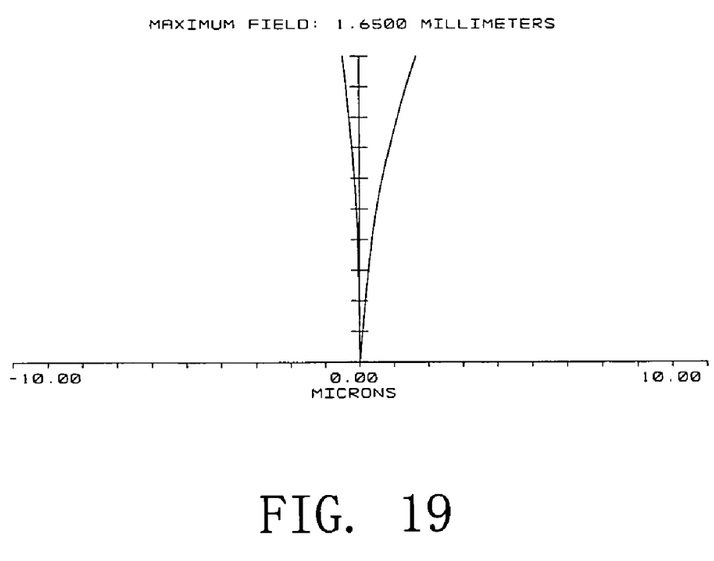

A stop 5 is arranged between the second and third lens groups 2, 3 for light intensity adjustment. A glass block 4, corresponding to an IR (infrared) filter, a cover glass of an image pickup device, or the like, is arranged between the negative lens 32 of the third lens group 3 and the image plane 6. Both the first lens group 1 and the image plane 6 are stationary, so that the overall length of the present zoom lens is fixed, whereby incorporation of the present zoom lens into compact digital camera modules such as those used in cell phones is significantly facilitated, and risk of accident impact on and damage to the cell phones during carry and use thus can be decreased. According to the configuration of the present zoom lens, zooming is effected by moving the second lens group 2 to vary the distance between the first and second lens groups 1 and 2. The position of the third lens group 3 is adjustable to compensate for the image plane 6 shift due to the focal length change. Accordingly, the distance D1 between the fixed first lens group 1 and the movable second lens group 2 is variable. The distance D2 between the stop 5, which moves along with the second lens group 2, and the third lens group 3, is also variable. In addition, the distance D3 between the glass block 4 and the image plane 6 is also variable. FIGS. 1-3 are optical cross-sectional views of the present compact zoom lens, showing the lens configuration at the telephoto end, the intermediate zoom position and the wide-angle end, respectively. It is shown that, during zooming from the wide-angle end to the telephoto end, the distance D1 decreases, and both the distances D2 and D3 increase.

As disclosed above, the present zoom lens employs only four lenses in three groups, and thus is compact in configuration. The application of an inner focusing system improves handling and focus operation from infinity to close-up, by keeping the overall length of the present zoom lens constant. It also allows easy handling and use of circular polarizing filters, as the front barrel does not rotate during focusing. Specifically, the present zoom lens has an overall length of approximately 9 mm, making it easy to incorporate into miniature optical pathways. To ensure a sufficient back focal length for disposing various optical members such as a cover glass and an IR filter in such a short overall length, the present zoom lens satisfies the following conditional expression:

$$0.27 < \frac{f_{bw}}{TT} < 0.35 \quad \text{(a-1)}$$

where $f_{bw}$ is the back focal length at the wide-angle end as shown in FIG. 3, and TT is the total optical track of the present zoom lens from the vertex of the first surface 11 of the negative lens 10 to the image plane 6. The total optical track TT is constant for both telephoto end and wide-angle. When the value $f_{bw}/TT$ exceeds the upper limit of condition (a-1), the angle of incidence to the image plane 6 becomes too large, and the brightness of the circumferential portion of the image decreases. This phenomenon is called shading. On the other hand, if the value is less than the lower limit of condition (a-1), the back focal length becomes too small to allow for the arrangement of a cover glass or an IR filter between the third lens group 3 and the image plane 6.

In such a short overall length, the present zoom lens still provides a 2× zoom ratio. To ensure such a relatively high zoom ratio, the following conditional expression is satisfied:

$$1.7 < \frac{f_2}{f_3} < 2.9 \quad \text{(a-2)}$$

where $f_2$ represents the focal length of the second lens group 2, and $f_3$ represents the focal length of the third lens group 3. If the positive refractive power of the positive third lens group 3 becomes relatively weak to the extent that the value $f_2/f_3$ is less than the lower limit of condition (a-2), the traveling distance of the positive third lens group 3 upon zooming would be made longer. If the positive refractive power of the positive third lens group 3 becomes relatively strong to the extent that the value $f_2/f_3$ exceeds the upper limit of condition (a-2), aberration fluctuations upon zooming are increased, and the correcting of aberrations over the entire focal length range becomes difficult.

To achieve a 2× zoom ratio, the present compact zoom lens further satisfies the following conditional expression:

$$0.16 < \frac{I_C}{TT} < 2.2 \quad \text{(a-3)}$$

where $I_C$ represents the maximum image height (the length from the center of an image to the periphery of the image) or the radius of an image circle, and TT represents the total optical track of the present zoom lens from the vertex of the first surface 11 of the negative 10 to the image plane 6. The total optical track TT is constant for both telephoto end and wide-angle end. When the value $I_C/TT$ is less than the lower limit of condition (a-3), the total optical track becomes relatively large. When the value $I_C/TT$ exceeds the upper limit of condition (a-3), the amount of distortion rapidly increases and the incident angle to the image plane 6 is too large.

The negative lens 10 and the positive lens 31 and the negative lens 32 of the third lens group 3 are all aspheric lenses for efficiently correcting aberrations. If these lenses are configured as spherical lenses, additional cemented correcting lenses must be employed for aberration compensation, which results in increased overall length of the zoom lens. By configuring these lenses as aspheric lenses, the lens count of the present zoom lens is significantly reduced, thereby reducing the overall physical length. The aspheric surfaces of the negative lens 10, the positive lens 31 and the negative lens 32 are expressed by the following equation:

$$z = \frac{ch^2}{1 + [1 - (k+1)c^2 h^2]^{\frac{1}{2}}} + A h^4 + B h^6 + C h^8 + D h^{10}$$

where, z represents a sag amount which is defined as a distance from a point on the aspheric surface to a plane tangential to the aspheric surface at the optical axis; c=1/r, r is the paraxial radius of curvature; h represents a height of a point on the aspheric surface with respect to the optical axis; k represents a cone constant; and A, B, C and D are aspheric coefficients for fourth, sixth, eighth and tenth order terms.

The present invention will be more fully understood by describing two embodiments as follows.

The numerical data of Numerical Embodiments 1 and 2 will be shown below. In each numerical embodiment, i (i=1-10) indicates the order of the surface from the object side (including lens surface, stop 5 and glass block 4), Ri indicates the radius of curvature of the ith surface, D indicates the ith member thickness or the distance between the ith surface and the (i+1)th surface, and Nd and Vd indicate the refractive index and Abbe number of the ith member, respectively, for d-line.

Numerical Embodiment 1

| Surface (i) | Ri (mm) | D (mm) | Nd | Vd | Conic |
|---|---|---|---|---|---|
| 1 | 470.0012 | 0.5 | 1.5435 | 56.8 | 0 |
| 2 | 2.239547 | Variable Distance 1 | | | −1 |

-continued

Numerical Embodiment 1

| Surface (i) | Ri (mm) | D (mm) | Nd | Vd | Conic |
|---|---|---|---|---|---|
| 3 | −9.084144 | 0.8 | 1.62041 | 60.3 | 0 |
| 4 | −3.941202 | 0.1 | | | 0 |
| 5 | (Stop) | Variable Distance 2 | | | 0 |
| 6 | 1.396086 | 1.4 | 1.5435 | 56.8 | −1.239444 |
| 7 | −4.89327 | 0.2 | | | 30.82663 |
| 8 | −2.31207 | 0.45 | 1.5854 | 29.1 | −1 |
| 9 | 4.04246 | 0.3 | | | 23.45668 |
| 10 | ∞ | Variable Distance 3 | | | | wherein,

| | Maximum wide-angle state | Maximum telephoto state |
|---|---|---|
| Variable Distance 1 | 2.8533 | 0.8389 |
| Variable Distance 2 | 0.09 | 0.7805 |
| Variable Distance 3 | 2.471 | 3.795 |
| Effective Focal Length | 2.574 | 4.566 |
| F number | 2.9 | 3.95 |

Aspheric coefficients for the aspheric surfaces are illustrated below:

| Coef. Surface (i) | A | B | C | D |
|---|---|---|---|---|
| 1 | −0.0055125643 | 0.0043866775 | −0.00063484141 | 1.7949735e−005 |
| 2 | −0.0068155134 | 0.028801197 | −0.010494103 | 0.0027183382 |
| 6 | 0.055329246 | −0.0027846422 | 0.022726914 | 0 |
| 7 | 0.071001703 | −0.10493481 | 0.29233833 | 0 |
| 9 | 0.084008727 | 0.0136511 | −0.091784737 | 0 |

It is clear from the above tables that, in the Numerical Embodiment 1 of the present invention, the negative lens 10 is a two-sided aspheric lens, the positive lens 20 is a spherical lens, the positive lens 31 of the third lens group 3 is a two-sided aspheric lens, and the image-side surface 322 of the negative lens 32 of the third lens group 3 is aspheric. The respective values of the above conditions (a-1), (a-2) and (a-3) are: $f_{bw}/TT=0.28$, $f_2/f_3=2.69$ and $I_c/TT=0.18$. Aberrations of the compact zoom lens according to Numerical Embodiment 1 at the wide-angle end and the telephoto end are respectively shown in FIGS. 4-7 and 8-11. It can be seen that the present compact zoom lens of Numerical Embodiment 1 provides excellent correction of various aberrations and thus a high level of optical performance.

Numerical Embodiment 2

| Surface (i) | Ri (mm) | D (mm) | Nd | Vd | Conic |
|---|---|---|---|---|---|
| 1 | 223.2092 | 0.5 | 1.5435 | 56.8 | 8620.948 |
| 2 | 2.090871 | Variable Distance 1 | | | −1 |
| 3 | −6.26885 | 0.7 | 1.62041 | 60.3 | 0 |
| 4 | −3.043807 | 0.1 | | | 0 |
| 5 | Stop | Variable Distance 2 | | | 0 |
| 6 | 1.344059 | 1.023999 | 1.5435 | 56.8 | −1.490568 |
| 7 | −4.400221 | 0.1500616 | | | 17.33977 |
| 8 | −2.357824 | 0.45 | 1.5854 | 29.1 | −7.413299 |
| 9 | 3.07069 | 0.3 | | | 16.27429 |
| 10 | ∞ | Variable Distance 3 | | | | wherein,

| | Maximum wide-angle state | Maximum telephoto state |
|---|---|---|
| Variable Distance 1 | 2.976 | 1.023 |
| Variable Distance 2 | 0.07 | 0.408 |
| Variable Distance 3 | 2.903 | 4.463 |
| Effective Focal Length | 2.544 | 4.789 |
| F number | 2.87 | 4.147 |

Aspheric coefficients for the aspheric surfaces are illustrated below:

| Coef. Surface (i) | A | B | C | D |
|---|---|---|---|---|
| 1 | −0.018512495 | 0.015452408 | −0.0046441965 | 0.00059242288 |
| 2 | −0.033706383 | 0.061844376 | −0.030803881 | 0.0083759309 |
| 6 | 0.054538827 | −0.0046012417 | −0.002539307 | 0 |

-continued

Aspheric coefficients for the aspheric surfaces are illustrated below:

| Coef. Surface (i) | A | B | C | D |
|---|---|---|---|---|
| 7 | −0.050886051 | 0.022390123 | 0.046666311 | 0 |
| 8 | 0.024594525 | −0.050504128 | 0.053425899 | 0 |
| 9 | 0.255246 | −0.34362515 | 0.7835933 | −1.1537408 |

It is clear from the above tables that, in the Numerical Embodiment 2 of the present invention, the negative lens 10 is a two-sided aspheric lens, the positive lens 20 is a spherical lens, and both the positive lens 31 and the negative lens 32 of the third lens group 3 are two-sided aspheric lenses. The respective values of the above conditions (a-1), (a-2) and (a-3) are: $f_{bw}/TT=0.33$, $f_2/f_3=1.97$ and $I_c/TT=0.19$. Aberrations of the compact zoom lens according to Numerical Embodiment 2 at the wide-angle end and the telephoto end are respectively shown in FIGS. 12-15 and 16-19. It can be seen that the present compact zoom lens of Numerical Embodiment 2 provides excellent correction of various aberrations and thus a high level of optical performance.

According to the concept of the present invention, the present zoom lens is a three-group zoom lens having a negative-positive-positive optical configuration. Both the first lens group and the image plane are stationary, thereby providing a fixed and shortened overall length for facilitating handle. Zooming is effected by varying the distance between the first and second lens groups. Correction of an image point position resulting from the focal length change is effected by the third lens group. The present compact zoom lens is composed of only four single lenses and thus has an overall length of only 9 mm while achieving an approximately 2× zoom ratio. Sufficient back focal length is ensured even in such a short overall length. Using the lens element arrangement of the present invention in combination with suitable selection of the material and the surface prescription for each lens element, a high level of optical performance is ensured, production cost is significantly reduced for high volume manufacturing, and the overall physical length is shortened making it suitable for compact digital camera modules such as those used in cell phones.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A zoom lens consisting of, from the object side to the image side, a first lens group of negative refractive power, a second lens group of positive refractive power, a third lens group of positive refractive power, and a stop disposed between the second and third lens groups, the first lens group being stationary and both the second and third lens groups being movable along the optical axis, the distance between the first and second lens groups being variable for effecting focal length change, the third lens group being movable to compensate for image plane shift due to focal length change and thereby maintain the position of the image plane.

2. The zoom lens as claimed in claim 1, wherein the first lens group consists of a negative lens for receiving light from the object, at least one surface of the negative lens being aspheric.

3. The zoom lens as claimed in claim 2, wherein the second lens group consists of a positive lens having a pair of opposite spherical surfaces.

4. The zoom lens as claimed in claim 3, wherein the third lens group comprises a positive lens and a negative lens, at least one surface of the positive lens and the negative lens being aspheric.

5. The zoom lens as claimed in claim 4, wherein the negative lens of the first lens group, and the positive lens and the negative lens of the third lens group are all made of plastic, and the positive lens of the second lens group is made of glass.

6. The zoom lens as claimed in claim 4, wherein the aspheric surfaces are expressed by the following equation:

$$z = \frac{ch^2}{1 + [1-(k+1)c^2h^2]^{\frac{1}{2}}} + Ah^4 + Bh^6 + Ch^8 + Dh^{10}$$

where, z represents a sag amount which is defined as a distance from a point on the aspheric surface to a plane tangential to the aspheric surface at the optical axis; $c = 1/r$, r is the paraxial radius of curvature; h represents a height of a point on the aspheric surface with respect to the optical axis; k represents a cone constant; and A, B, C and D are aspheric coefficients for fourth, sixth, eighth and tenth order terms.

7. The zoom lens as claimed in claim 1, satisfying the following condition:

$$0.27 < \frac{f_{bw}}{TT} < 0.35$$

where $f_{bw}$ is the back focal length at the wide-angle end, and TT is the total optical track of the zoom lens.

8. The zoom lens as claimed in claim 7, wherein the second and third lens groups satisfy the following condition:

where $f_2$ represents $$1.7 < \frac{f_2}{f_3} < 2.9$$

focal length of the second lens group, and f3 represents the focal length of the third lens group.

9. The zoom lens as claimed in claim 8, satisfying the following conditional expression:

$$0.16 < \frac{I_C}{TT} < 2.2$$

where $I_c$ represents the maximum image height, and TT represents the total optical track of the zoom lens.

10. The zoom lens as claimed in claim 1, further comprising an infrared filter or a glass cover for an image pickup device disposed between the third lens group and the image plane.

11. The zoom lens as claimed in claim 1, consisting of four single lenses.

12. The zoom lens as claimed in claim 1, wherein the distance between the second and third lens groups is decreased during zooming from the telephoto end to the wide-angle end.

13. A zoom lens comprising, from the object side to the image side, a stationary first lens group of negative refractive power, a movable second lens group of positive refractive power, and a movable third lens group of positive refractive power, the distance between the first and second lens groups being variable for zooming, the distance between the second and third lens groups being variable for focusing, the zoom lens satisfying the following conditions:

$$0.27 < \frac{f_{bw}}{TT} < 0.35 \qquad (a\text{-}1)$$

where $f_{bw}$ is the back focal length at the wide-angle end, and TT is the total optical track of the zoom lens;

$$1.7 < \frac{f_2}{f_3} < 2.9 \qquad (a\text{-}2)$$

where $f_2$ represents the focal length of the second lens group, and $f_3$ represents the focal length of the third lens group; and $$0.16 < \frac{I_C}{TT} < 2.2 \qquad (a\text{-}3)$$

where $I_c$ represents the maximum image height, and TT represents the total optical track of the zoom lens.

14. The zoom lens as claimed in claim 13, wherein the first lens group comprises a negative lens, the second lens group comprises a positive lens, and the third lens group comprises a positive lens and a negative lens.

15. The zoom lens as claimed in claim 14, wherein the negative lens of the first lens group is an aspheric lens, the positive lens of the second lens group is a spherical lens, and both the positive lens and the negative lens of the third lens group are aspheric lenses.

16. The zoom lens as claimed in claim 15, wherein at least one surface of the negative lens of the first lens group being aspheric.

17. The zoom lens as claimed in claim 15, wherein at least one surface of the negative lens of the third lens group being aspheric.

18. The zoom lens as claimed in claim 15, wherein the negative lens of the first lens group, and the positive lens and the negative lens of the third lens group are all made of plastic, and the positive lens of the second lens group is made of glass.

19. The zoom lens as claimed in claim 13, having a fixed overall length measured from the frontmost vertex of the first lens group to an image plane thereof.

* * * * *